(12) United States Patent
Yoshiguchi et al.

(10) Patent No.: US 9,415,720 B2
(45) Date of Patent: Aug. 16, 2016

(54) LIGHTING SYSTEM OF TRANSPORT AND AIRCRAFT

(71) Applicant: Mitsubishi Aircraft Corporation, Aichi (JP)

(72) Inventors: Takuya Yoshiguchi, Aichi (JP); Makoto Goto, Aichi (JP); Takahiro Tsujinishi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 170 days.

(21) Appl. No.: 14/319,373

(22) Filed: Jun. 30, 2014

(65) Prior Publication Data

US 2015/0036364 A1 Feb. 5, 2015

(30) Foreign Application Priority Data

Jul. 31, 2013 (JP) ................................. 2013-159825

(51) Int. Cl.
*B64D 47/02* (2006.01)
*B60Q 3/02* (2006.01)
*B64D 11/00* (2006.01)

(52) U.S. Cl.
CPC .............. *B60Q 3/0259* (2013.01); *B60Q 3/025* (2013.01); *B64D 11/00* (2013.01); *B64D 47/02* (2013.01); *B64D 2011/0038* (2013.01)

(58) Field of Classification Search
CPC .. B60Q 3/0293; B60Q 3/0296; B60Q 3/0259; B64D 47/02; B64D 2011/0038
See application file for complete search history.

(56) References Cited

U.S. PATENT DOCUMENTS

| 2012/0187839 | A1* | 7/2012 | Hammel | B60Q 3/0259 315/77 |
| 2015/0062941 | A1* | 3/2015 | Sura | B60Q 3/0293 362/488 |

* cited by examiner

*Primary Examiner* — Mariceli Santiago
(74) *Attorney, Agent, or Firm* — Pearne & Gordon LLP

(57) ABSTRACT

To provide a lighting system which can solve the inconvenience experienced by a pilot entering and leaving a control cabin of a transport such as an aircraft. A lighting system LS of an aircraft 1 includes: lights 21 that illuminate a control cabin 15; a lighting power supply system 22 including a main path 22M which supplies power to the lights 21 and a sub path 22S which supplies power to the lights 21; a first switch SW1 that enables and disables power supply through the main path 22M; and a second switch SW2 that enables and disables power supply through the sub path 22S.

18 Claims, 4 Drawing Sheets

LIGHTING SYSTEM OF TRANSPORT AND AIRCRAFT

BACKGROUND OF THE INVENTION

1. Field of the Invention

The present invention relates to a lighting system for illuminating at least a control cabin of a transport, and an aircraft.

2. Description of the Related Art

A dome light for illuminating an entire control cabin of an aircraft is typically installed around an overhead panel that is located on the front side in the control cabin. A lighting switch for switching ON the dome light is provided in the overhead panel along with various operation switches.

A pilot enters an entrance room of the aircraft from a doorway connected to a boarding gate of an airport, and enters the control cabin through an aisle. The pilot then activates a flight system by turning ON a power switch that is provided in the overhead panel. The dome light can be thereby switched ON and switched OFF by operating the lighting switch.

The pilot switches ON the dome light when brightness in the control cabin is not enough, for example, in the early evening and the evening. The pilot switches OFF the dome light after a flight is started.

The dome light for illuminating the control cabin is not switched ON unless the lighting switch is operated after turning ON the power switch provided in the overhead panel within the control cabin. Thus, in some cases, it is dim or dark in the control cabin just when the pilot enters the control cabin, which is inconvenient for the pilot.

Also, when the flight is terminated, the power switch for the flight system is turned OFF. The lighting switch is thereby also turned OFF. Thus, when it is dark in the control cabin, it is inconvenient for the pilot to leave the control cabin.

The present invention relates to a light for a control cabin of a transport such as an aircraft, and an object thereof is to provide a lighting system of a transport and an aircraft, which can solve the above inconvenience.

SUMMARY OF THE INVENTION

A lighting system of a transport according to the present invention includes: a lighting device that illuminates a control cabin of the transport; a lighting power supply system including a first path which supplies power to the lighting device and a second path which supplies power to the lighting device; a first switch that enables and disables power supply through the first path; and a second switch that enables and disables power supply through the second path.

In accordance with the present invention, the lighting power supply system includes the second path, through which power can be supplied to the lighting device, separately from the first path. Accordingly, when a pilot boards the transport, the pilot can enable the power supply through the second path by the second switch, without waiting for the power supply through the first path by operating the first switch, to thereby supply power to the lighting device. Even when the power supply through the first path is not enabled, the lighting device can be switched ON through the second path. Thus, the pilot can leave the control cabin with the lighting device lit through the second path, and then switch OFF the lighting device.

Accordingly, the inconvenience experienced by a pilot entering and leaving the control cabin when it is dark in the control cabin can be solved.

In the lighting system of a transport according to the present invention, it is preferable that when a power switch for a control system used for controlling the transport is turned ON, the second switch is turned OFF to disable the power supply through the second path, and when the power switch is turned OFF, the first switch is turned OFF to disable the power supply through the first path.

In the configuration, control to disable the second path by turning OFF the second switch when the power switch for the control system is turned ON, and to disable the first path by turning OFF the first switch when the power switch is turned OFF is performed.

Because of the control, the second path is disabled during a flight in which the control system is in operation. Thus, the lighting device can be switched ON and switched OFF only by operating the first switch. The first path is disabled after the flight. Thus, the lighting device can be reliably switched OFF by turning OFF the second switch at the time of disembarkation.

In the lighting system of a transport according to the present invention, it is preferable that the transport includes a doorway that allows entrance and exit to/from the transport, and an entrance room that faces the doorway, the control cabin leads to the doorway through the entrance room, the first switch is located in the control cabin, and the second switch is located in the entrance room.

The configuration is achieved based on an advantage that, since the lighting power supply system includes the first path and the second path, the second path can be arranged extending to the outside of the control cabin where the lighting device is installed, and the second switch for enabling and disabling the power supply through the second path can be provided outside of the control cabin.

Since the second switch is located in the entrance room that is a first space in the transport which a pilot enters when boarding the transport, the configuration is more convenient as compared to a case in which the second switch is located in a place behind the entrance room.

That is, when boarding the transport, the pilot does not need to walk in the darkness in the transport by switching ON the lighting device first by the second switch. When disembarking from the transport, the pilot also does not need to walk in the darkness in the transport by switching OFF the lighting device last by the second switch.

In the lighting system of a transport according to the present invention, the power supply through the second path may be enabled by turning ON the second switch when entrance into the control cabin or the entrance room is detected.

The operation of the second switch may be automated as described above.

The present invention may be favorably used as a lighting system of an aircraft.

An aircraft of the present invention includes the above lighting system of a transport, and the transport is an aircraft.

In accordance with the present invention, the inconvenience experienced by a pilot entering and leaving the control cabin when it is dark in the control cabin can be solved.

DETAILED DESCRIPTION OF THE PREFERRED EMBODIMENT

In the following, an embodiment according to the present invention is described with reference to the accompanying drawings.

Figure 1:
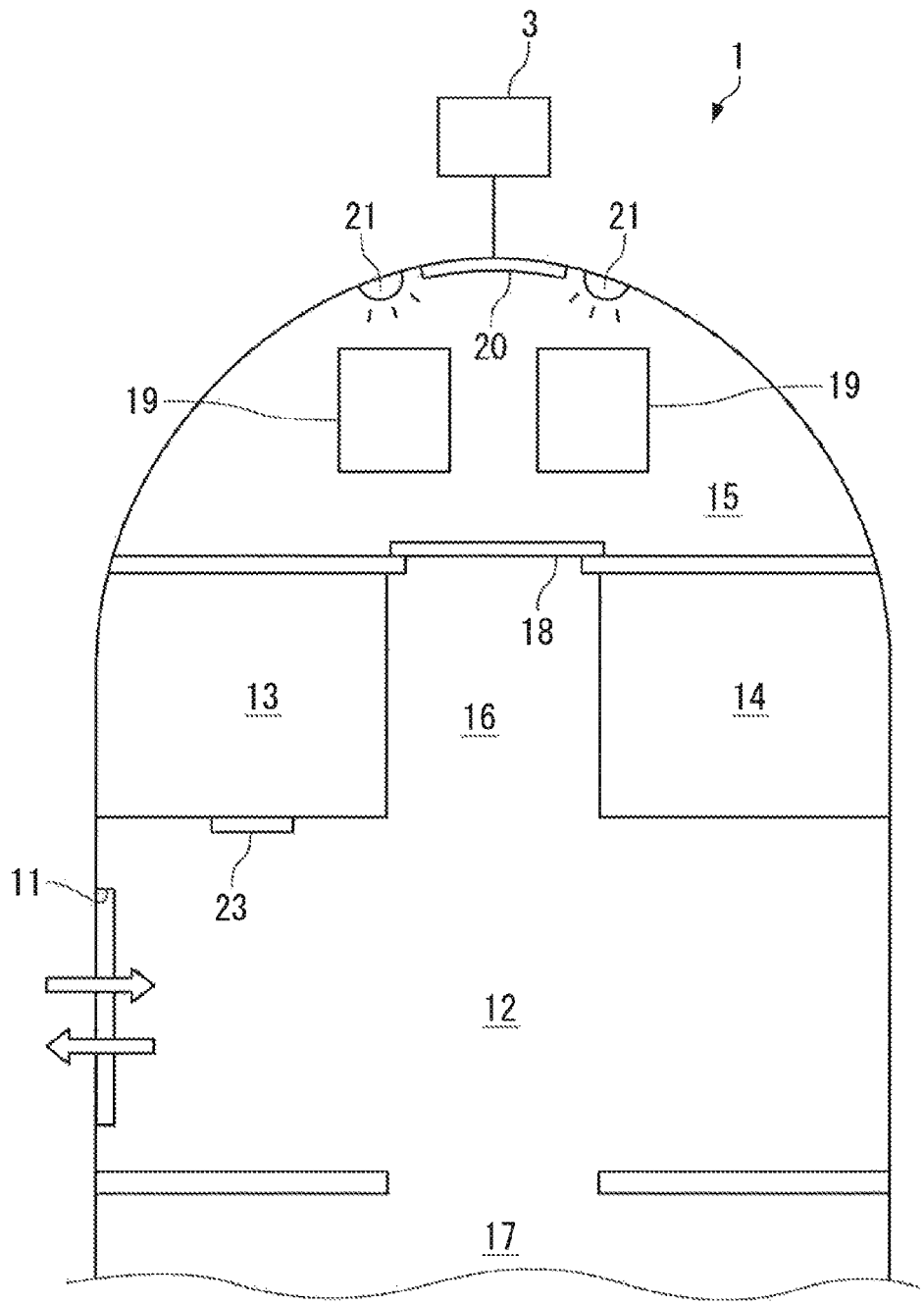
FIG. 1 is a plan view schematically illustrating the nose side of an aircraft according to an embodiment of the present invention.

As shown in FIG. 1, a doorway 11, an entrance room 12 facing the doorway 11, a lavatory 13, a galley 14, and a control cabin (flight deck) 15 are provided on the nose side of an aircraft 1.

The doorway 11 is connected to a boarding gate of an airport, and opened and closed by a door (not shown) with respect to the outside of the aircraft 1.

The entrance room 12 is provided immediately next to the doorway 11. The entrance room 12 leads to a cabin 17, and also leads to the control cabin 15 through an aisle 16.

The lavatory 13 and the galley 14 are provided between the entrance room 12 and the control cabin 15 with the aisle 16 therebetween.

The control cabin 15 is located at the foremost position of an airframe. A control stick, a control wheel, gauges and indicators, pilot's seats 19 or the like are arranged in the control cabin 15. A door 18 is provided in an opening of the control cabin 15 facing the aisle 16.

Figure 2:
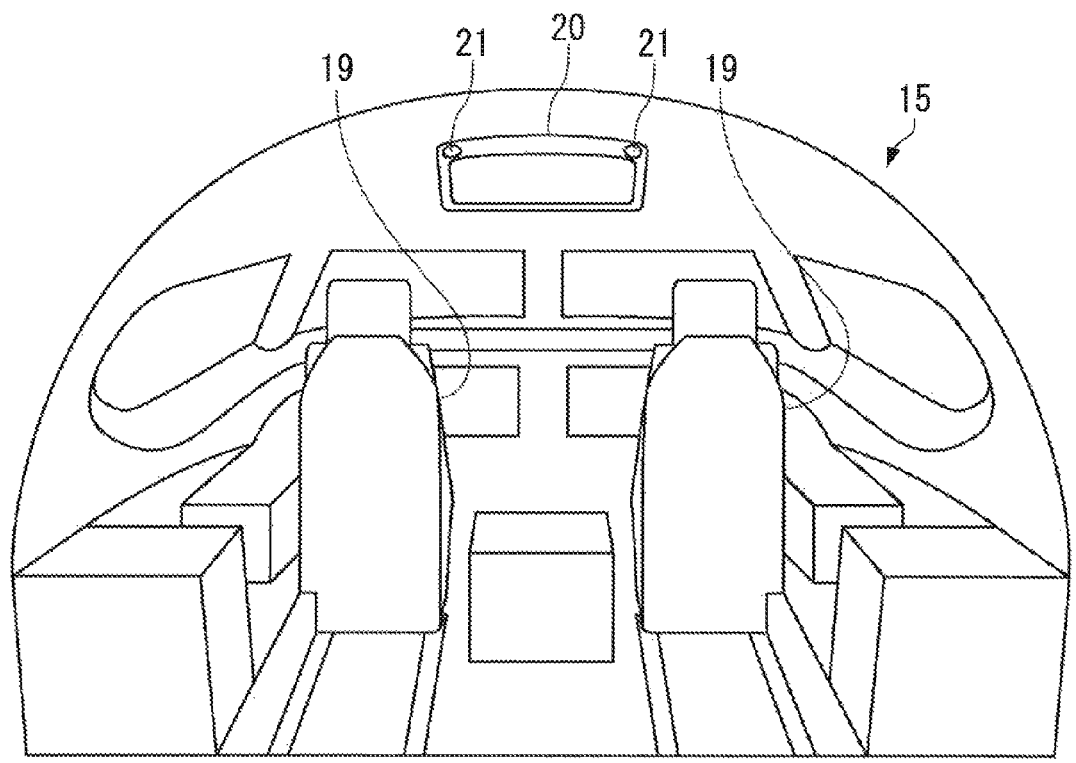
FIG. 2 is a schematic view illustrating a control cabin.

As shown in FIG. 2, an overhead panel 20 is installed on a wall or a ceiling of the control cabin 15 at a position above a sitting pilot within the field of view (at an overhead forward position). A pair of lights (lighting device) 21 are also installed on the wall or the ceiling of the control cabin 15 on the both sides of the overhead panel 20.

The lights 21 are used for illuminating the entire control cabin 15. The lights 21 are also called dome lights. A lighting switch provided in the overhead panel 20 is operated to switch ON or switch OFF the lights 21, and adjust the brightness of the lights 21. The lights 21 may be provided in any number and may have any structure. Although a local light for illuminating an object(s) near the hand(s) of a pilot is also provided in the control cabin 15, the light other than the lights 21 is omitted in the drawings and the description thereof is also omitted.

Figure 3:
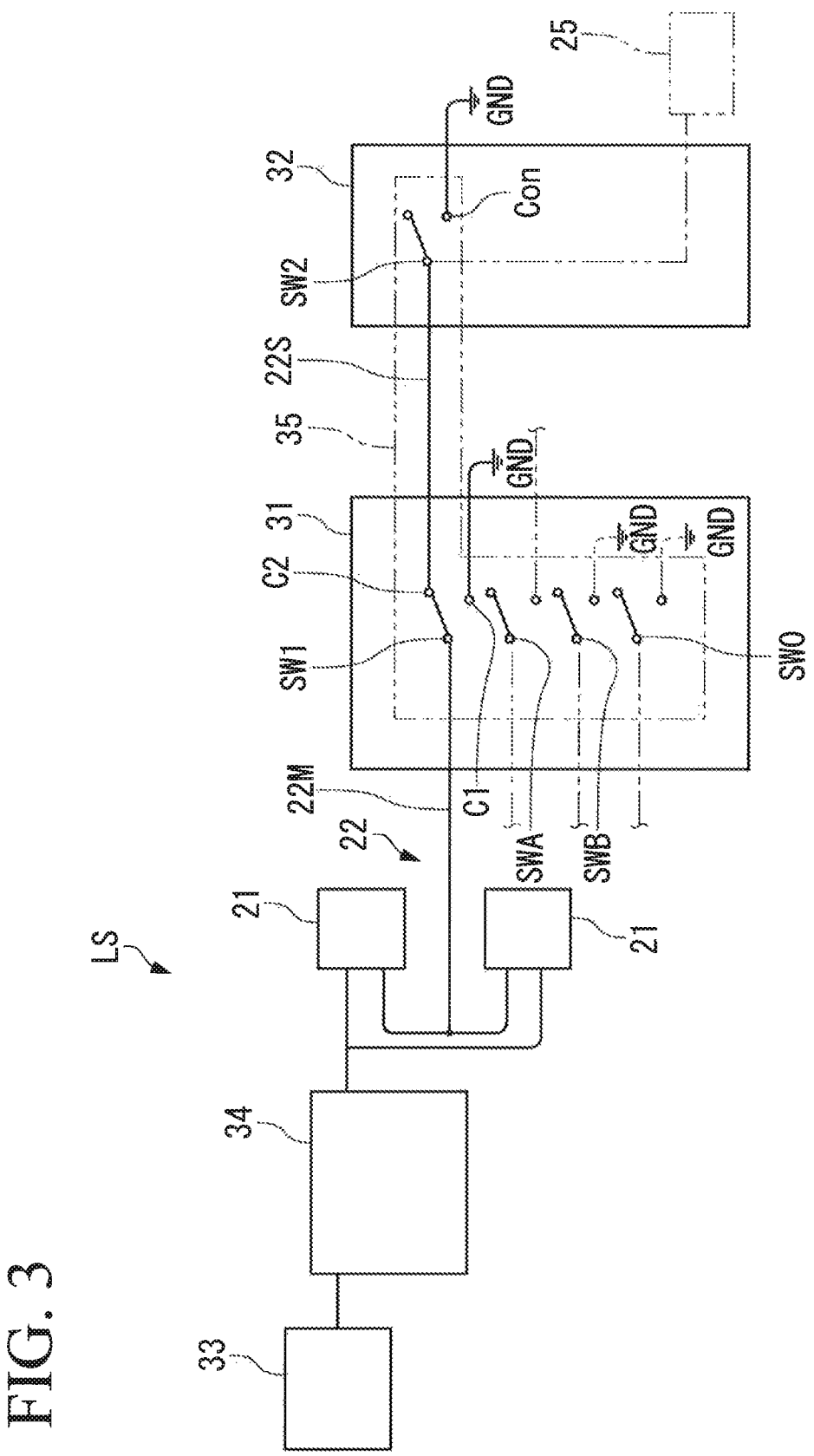
FIG. 3 is a block diagram illustrating a lighting system incorporated in a flight system provided in the aircraft.

The aircraft 1 includes a lighting system LS shown in FIG. 3.

The lighting system LS includes the pair of lights 21, and a lighting power supply system 22 that supplies power to the lights 21.

The lighting system LS is included in a flight system 3 (FIG. 1) operated by a pilot. The flight system 3 controls the operations of equipments used for piloting the aircraft, and various other equipments.

The flight system 3 includes a power distribution device 33, a center overhead panel circuit section 34, a first circuit section 31, a second circuit section 32, and various equipments such as the control stick, the control wheel, the gauges, the indicators, and the lights 21. Power is supplied to the respective equipments from the power distribution device 33 according to the state of a circuit breaker provided in the center overhead panel circuit section 34, or the states of switches provided in the first circuit section 31 and the second circuit section 32.

The flight system 3 is activated when a power switch SW0 provided in the first circuit section 31 is turned ON.

FIG. 3 shows only the lights 21 out of the equipments provided in the flight system 3, and also shows only the lighting power supply system 22 that supplies power to the lights 21 from the power distribution device 33. A system that supplies power to the other equipments is omitted in FIG. 3.

The power distribution device 33 controls power supply from a generator provided in an engine of the aircraft, an external power source connected to the aircraft, and an APU (auxiliary power unit) of the aircraft for any load of the airframe.

When a first switch SW1 of the first circuit section 31 is turned ON, the power distribution device 33 distributes power to the lights 21.

The center overhead panel circuit section 34 covers a region defined in the center of the overhead panel 20. The lighting switch for turning ON/OFF the lights 21 or adjusting the brightness thereof is arranged in the center overhead panel circuit section 34.

The first circuit section 31 corresponds to one portion of a power block of the overhead panel 20. The power block of the overhead panel 20 turns ON the power supply from the APU, the power supply from the external power source, and the power supply from the generator provided in the engine.

The power switch SW0, the first switch SW1, switches SWA and SWB, and a switch control section 35 are provided in the first circuit section 31. FIG. 3 shows only some of the switches provided in the first circuit section 31.

The power switch SW0 is used for powering ON/OFF the flight system 3. The power switch SW0 and the switches SWA and SWB are switches related to power supply.

The first switch SW1 is turned ON when the lighting switch for the lights 21 provided in the center overhead panel circuit section 34 is ON, and turned OFF when the lighting switch is OFF.

All of the first switch SW1 and the switches SWA and SWB are connected to the power distribution device 33 when the power switch SW0 is turned ON, and disconnected from the power distribution device 33 when the power switch SW0 is turned OFF.

The switch control section 35 controls the states of the switches when the flight system 3 is activated or terminated, or when necessary.

A second switch SW2 for switching ON/OFF the lights 21 is provided in the second circuit section 32. An indicating lamp or the like for indicating whether the lights 21 are in an ON or OFF state when the second switch SW2 is operated is also preferably provided in the second circuit section 32.

The second circuit section 32 is incorporated in a control panel 23 (FIG. 1) installed on a wall of the entrance room 12.

An operation switch for lights in the cabin 17, a circuit for an intercom system (not shown) or the like may be also provided in the control panel 23.

In the following, the configuration of the lighting power supply system 22 is described.

The lighting power supply system 22 includes a main path 22M through which power is supplied to the lights 21, and a sub path 22S through which power is supplied to the lights 21 even when power supply through the main path 22M is disabled.

Power supply through the main path 22M is enabled when the first switch SW1 is turned ON, and disabled when the first switch SW1 is turned OFF.

Power supply through the sub path 22S is enabled when the second switch SW2 is turned ON, and disabled when the second switch SW2 is turned OFF.

When the main path 22M and the sub path 22S are configured to simply exist together, the configuration may not be consistent with the utility form of the lights 21.

For example, during a flight, the lights 21 are basically switched OFF. When the first switch SW1 is turned OFF in the control cabin 15, it is not desirable that the lights 21 are switched ON through the sub path 22S with the second switch SW2 turned ON.

When the second switch SW2 is turned OFF in the entrance room 12 so as to switch OFF the lights 21 after the flight, it is not desirable that the lights 21 are switched ON through the main path 22M with the first switch SW1 turned ON.

Accordingly, in the lighting system LS of the present embodiment, control for a period in which the flight system 3 is in operation (corresponding to a flight period) from when the power switch SW0 is turned ON to when the power switch SW0 is turned OFF, and control for a period in which the flight system 3 is not in operation (corresponding to a non-flight period) are performed.

To be more specific, the lighting system LS disables the sub path 22S by turning OFF the second switch SW2 while the flight system 3 is in operation, to thereby perform the sub-path disabling control to limit the power supply path to the lights 21 to the main path 22M. The lighting system LS also disables the main path 22M by turning OFF the first switch SW1 while the flight system 3 is not in operation, to thereby perform the main-path disabling control to limit the power supply path to the lights 21 to the sub path 22S.

To perform the control, the lighting system LS includes the switch control section 35.

The main path 22M and the sub path 22S are selectively used. The sub path 22S needs to be enabled only when the power supply through the main path 22M is disabled.

Therefore, in the present embodiment, the sub path 22S is enabled only when the first switch SW1 is in an OFF state by connecting the sub path 22S to the OFF side of the first switch SW1. That is, the first switch SW1 switches the power supply to the second switch SW2.

In the following, the configuration of the main path 22M and the sub path 22S including the more detailed configuration thereof is described.

The first switch SW1 has two contacts C1 and C2. The first switch SW1 can be switched to either the contact C1 or C2.

It is defined that a state in which the first switch SW1 is switched to the contact C1 is ON, and a state in which the first switch SW1 is switched to the contact C2 is OFF.

The contact C1 is connected to a ground GND. When the first switch SW1 is turned ON, power supply to the lighting power supply system 22 is enabled through the main path 22M passing through the center overhead panel circuit section 34, the lights 21, and the first contact C1 to the ground GND from the power distribution device 33.

The other contact C2 of the first switch SW1 is connected to the sub path 22S.

The second switch SW2 has one contact $C_{ON}$. When connected to the contact $C_{ON}$, the second switch SW2 is turned ON, and when disconnected from the contact $C_{ON}$, the second switch SW2 is turned OFF.

The contact $C_{ON}$ of the second switch SW2 is connected to a ground GND.

When the second switch SW2 is turned ON with the first switch SW1 turned OFF, power supply to the lighting power supply system 22 is enabled through the sub path 22S passing through the center overhead panel circuit section 34, the lights 21, the second contact C2, and the second switch SW2 to the ground GND from the power distribution device 33.

Both the main path 22M and the sub path 22S pass through the center overhead panel circuit section 34 and the lights 21 from the power distribution device 33, that is, have a common configuration before the first switch SW1.

Next, the operation of the lighting system LS is described with reference to Table 1 by providing examples of the ON/OFF states of the respective switches and the ON/OFF states of the lights 21 through respective situations from when a pilot boards the aircraft 1 to when the pilot disembarks from the aircraft 1.

TABLE 1

| Situation | Power switch | First switch | Second switch | Light |
|---|---|---|---|---|
| 1. Before boarding | OFF | OFF (Disabled) | OFF | OFF |
| 2. Boarding | OFF | OFF | ON | ON |
| 3. Activation of the flight system | ON | ON | OFF | ON |
| 4. Flight | ON | OFF | OFF | OFF |
| 5. Termination of the flight system | OFF | OFF | ON | ON |
| 6. Disembarkation | OFF | OFF (Disabled) | OFF | OFF |

[1. Before Boarding]

Before the pilot boards the aircraft 1, the power switch SW0 of the flight system 3 is in an OFF state. After switch control performed in [5. Termination of the flight system] in a previous flight, the first switch SW1 remains in an OFF state, and the sub path 22S remains enabled.

Therefore, the lighting power supply system 22 is in a state in which the power supply through the sub path 22S can be enabled by operating the second switch SW2.

[2. Boarding]

The pilot boards the aircraft 1 from the doorway 11, and enters the entrance room 12. At this time, if it is dark outside in the early-evening or the evening, or due to a bad weather, the pilot may turn ON the second switch SW2 of the control panel 23 in the entrance room 12. The power supply to the lighting power supply system 22 through the sub path 22S is thereby enabled, so that the lights 21 are switched ON.

The pilot can confirm that the lights 21 are switched ON based on the indicating lamp or the like indicating the ON/OFF state of the lights 21 by the second switch SW2.

[3. Activation of the Flight System]

The pilot passes through the aisle 16 from the entrance room 12 and enters the control cabin 15. At this time, the control cabin 15 is already illuminated by the lights 21. Thus, even when it is dark outside, the pilot can easily access to the pilot seat, which is convenient for the pilot.

When the pilot turns ON the power switch SW0 of the overhead panel 20, the flight system 3 is activated. At the time of activation, the switch control section 35 performs control to cause the first switch SW1 to succeed the ON/OFF state of the second switch SW2, and turn OFF the second switch SW2.

Here, the second switch SW2 is ON. Thus, the first switch SW1 is turned ON, and the lights 21 continue to be lit.

When the second switch SW2 is turned OFF, the sub path 22S is disabled (the power supply is disabled). The power supply path to the lights 21 is thereby limited to the main path 22M.

Subsequently, while the flight system 3 is in operation, the lights 21 are switched ON and switched OFF only by the ON/OFF operation of the lighting switch for the lights 21 provided in the center overhead panel circuit section 34.

Therefore, the ON/OFF state of the lights 21 is not changed even when the second switch SW2 in the entrance room 12 is operated.

[4. Flight]

When a flight is started, the pilot switches OFF the lights 21 by turning OFF the first switch SW1 so as to improve visibility of the outside from the control cabin 15.

During the flight, the lights 21 can be switched ON when brightness is required in the control cabin 15, and can be then switched OFF. For example, when the aircraft 1 encounters a storm, the lights 21 are temporarily switched ON by the lighting switch for the lights 21 provided in the center overhead panel circuit section 34 so as to mitigate the glare of lightning.

[5. Termination of the Flight System]

When the flight is terminated, the pilot turns OFF the power switch SW0 to terminate the flight system 3. When the flight system 3 is terminated, the switch control section 35 performs control to cause the second switch SW2 to succeed the ON/OFF state of the first switch SW1, and turn OFF the first switch SW1.

Since the second switch SW2 succeeds the ON/OFF state of the first switch SW1, the lights 21 continue to be lit when the lights 21 are lit before the termination of the flight system 3 (an example shown in Table 1).

Therefore, even when it is dark, the pilot can move in the control cabin 15 and easily access to the door 18.

When the lights 21 are not lit before the termination of the flight system 3, the lights 21 continue to be not lit.

The main path 22M is disabled by turning OFF the first switch SW1 by the control performed in the termination of the flight system 3. The power supply path to the lights 21 is thereby limited to the sub path 22S.

[6. Disembarkation]

After leaving the control cabin 15, the pilot turns OFF the second switch SW2 in the entrance room 12 to thereby switch OFF the lights 21, and disembarks from the aircraft 1.

At this time, the pilot can confirm whether the lights 21 are switched OFF based on the indicating lamp or the like indicating the ON/OFF state of the lights 21 by the second switch SW2.

In the following, the effects obtained by the present embodiment are described.

In the present embodiment, the lighting power supply system 22 of the lighting system LS includes the two paths (the main path 22M and the sub path 22S) through which power can be supplied to the lights 21. Therefore, even when the power supply through the main path 22M out of the two paths is disabled, the lights 21 can be switched ON and switched OFF by the second switch SW2 provided in the other sub path 22S.

The lighting power supply system 22 includes the main path 22M and the sub path 22S. Thus, the sub path 22S can be arranged extending to the outside of the control cabin 15 where the lights 21 are installed, and the second switch SW2 for enabling and disabling the power supply through the sub path 22S can be provided outside of the control cabin 15.

Accordingly, before entering the control cabin 15 and turning ON the power switch SW0, a pilot can switch ON the lights 21 by operating the second switch SW2. Even after turning OFF the power switch SW0 and leaving the control cabin 15, the pilot can switch OFF the lights 21 by operating the second switch SW2.

Furthermore, in the present embodiment, the control to disable the sub path 22S by turning OFF the second switch SW2 when the power switch SW0 for the flight system 3 is turned ON, and to disable the main path 22M by turning OFF the first switch SW1 when the power switch SW0 is turned OFF is performed. Thus, the problems occurring when the main path 22M and the sub path 22S simply exist together can be avoided.

That is, during the flight in which the flight system 3 is in operation, the sub path 22S is disabled. Thus, the lights 21 can be switched ON and switched OFF only by operating the lighting switch in the center overhead panel circuit section 34. When the flight is terminated, the main path 22M is disabled. Thus, the lights 21 can be reliably switched OFF by turning OFF the second switch SW2 at the time of disembarkation.

In the above embodiment, the second switch SW2 is arranged in the entrance room 12. However, the second switch SW2 may be also arranged in the aisle 16.

Moreover, the second switch SW2 is not limited to be arranged outside of the control cabin 15. For example, the second switch SW2 may be also provided around the door 18 within the control cabin 15.

In short, the second switch SW2 may be arranged in a place suitable for solving the inconvenience in moving in the darkness in the control cabin 15.

Next, a modification of the present invention is described.

In the above embodiment, it is assumed that the second switch SW2 is manually operated. However, the second switch SW2 may be also automatically operated under an appropriate situation.

For example, the second switch SW2 may be controlled to be turned ON when a pilot is detected to enter the control cabin 15 by a sensor 25 (indicated by an alternate long and two short dashes line in FIG. 3) by detecting that the door 18 of the control cabin 15 is opened.

Even when the sensor 25 is used, it is, of course, preferable to perform the control to turn OFF the second switch SW2 during the flight in which the flight system 3 is in operation in a similar manner to the above embodiment.

A motion sensor that detects a humane around the sensor may be also employed as the sensor 25. For example, the motion sensor may be provided around the door 18 of the control cabin 15, and when a pilot is detected to enter the control cabin 15 by the motion sensor, the second switch SW2 may be turned ON.

The motion sensor may be also provided in the entrance room 12, and when a pilot is detected to enter the entrance room 12, the second switch SW2 may be turned ON.

Moreover, a brightness sensor that detects brightness in the control cabin 15 may be employed as the sensor 25. When the brightness sensor detects that the brightness in the control cabin 15 is lower than predetermined brightness, the second switch SW2 may be turned ON. When the brightness sensor detects that the brightness in the control cabin 15 meets the predetermined brightness, the second switch SW2 may be turned OFF.

Although the lighting system LS of the above embodiment includes only the lighting device for illuminating the control cabin 15 out of a plurality of lights provided in the aircraft 1, the lighting system LS may also include a lighting device for illuminating the outside of the control cabin 15, for example, a light for illuminating the entrance room 12 or the aisle 16.

In this case, the configuration of the first switch SW1 and the second switch SW2 for the lights 21 for illuminating the control cabin 15 can be applied to the light for the entrance room 12 or the aisle 16.

Particularly, when the aircraft 1 is a large aircraft, the entrance room 12 has a large space. Thus, it may be dark in the back of the entrance room 12 or the aisle 16 since light from a boarding gate or external light does not reach the back of the entrance room 12 or the aisle 16.

Therefore, two power supply paths similar to the main path 22M and the sub path 22S of the above embodiment may be configured for the light for illuminating the back of the entrance room 12 or the light for illuminating the aisle 16.

To be more specific with the light for illuminating the back of the entrance room 12, the main path and the sub path for supplying power to the light for illuminating the back of the entrance room 12 are configured. The first switch SW1 for enabling and disabling the power supply through the main path, and the second switch SW2 for enabling and disabling the power supply through the sub path are provided as a switch for switching ON/OFF the light. In this case, for example, the first switch SW1 is arranged on a wall at the back of the entrance room 12, and the second switch SW2 is arranged on a wall around the doorway 11 of the entrance room 12.

Figure 4A:
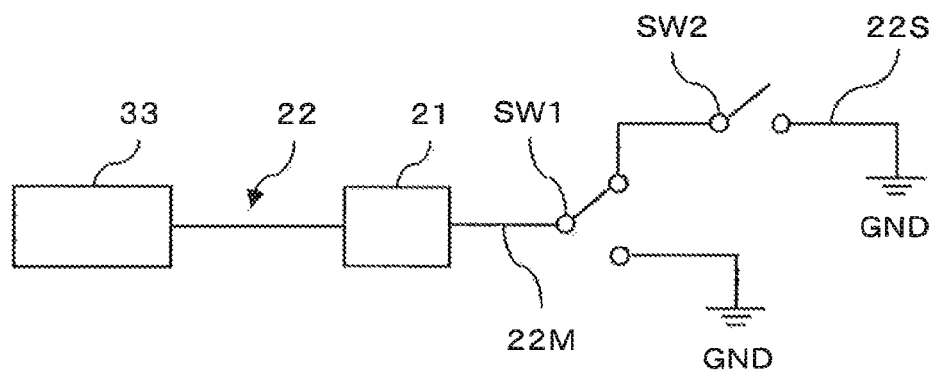
FIGS. 4A and 4B are diagrams illustrating the schematic configuration of a main path and a sub path provided in a lighting power supply system.

In the above embodiment, the sub path 22S is enabled only when the first switch SW1 is in an OFF state by connecting the sub path 22S to the OFF side of the first switch SW1 as shown in FIG. 4A.

Figure 4B:
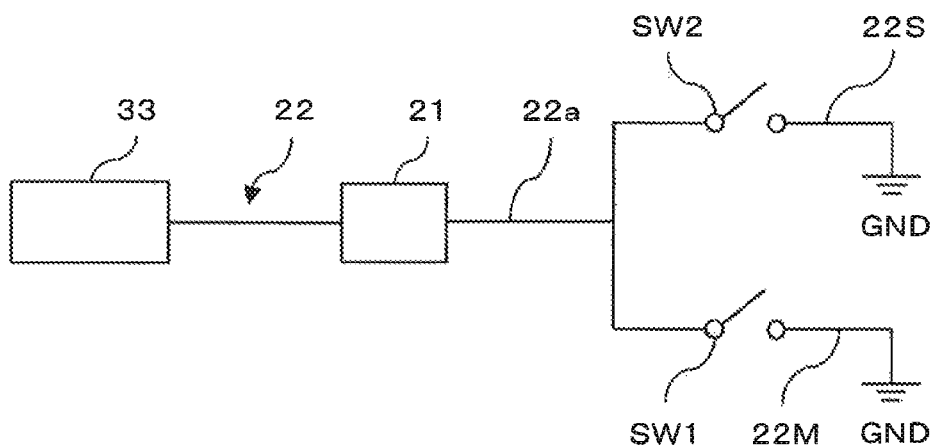

The present invention is not limited thereto. The main path 22M and the sub path 22S may be also connected in parallel to an electric path 22a of the lighting power supply system 22 as shown in FIG. 4B. Even when such a circuit is configured, the same effects as the above embodiment are obtained by performing the control to disable the sub path 22S by turning OFF the second switch SW2 when the power switch SW0 is turned ON, and to disable the main path 22M by turning OFF the first switch SW1 when the power switch SW0 is turned OFF.

In the present invention, a configuration in which the main path 22M and the sub path 22S are connected to separate power sources may be also employed.

The present invention may be also applied to a lighting system of a transport such as a vessel in addition to the aircraft.

The constitutions described in the aforementioned embodiment may be also freely selected or changed into other constitutions without departing from the gist of the present invention.

What is claimed is:

1. A lighting system of a transport comprising:
   a lighting device that illuminates a control cabin of the transport;
   a lighting power supply system including a first path which supplies power to the lighting device and a second path which supplies power to the lighting device;
   a first switch that enables and disables power supply through the first path; and
   a second switch that enables and disables power supply through the second path,
   wherein the first switch switches the power supply to the second switch.

2. The lighting system of a transport according to claim 1 wherein the first path and the second path are selectively used.

3. The lighting system of a transport according to claim 1 wherein the second path is enabled only when the first switch is in an OFF state.

4. The lighting system of a transport according to claim 1, wherein the transport includes an doorway that allows entrance and exit to/from the transport, and an entrance room that faces the doorway,
   the control cabin leads to the doorway through the entrance room,
   the first switch is located in the control cabin, and
   the second switch is located in the entrance room.

5. The lighting system of a transport according claim 4, wherein the power supply through the second path is enabled by turning ON the second switch when entrance into the control cabin or the entrance room is detected.

6. The lighting system of a transport according claim 1, wherein the power supply through the second path is enabled by turning ON the second switch when entrance into the control cabin is detected.

7. The lighting system of a transport according claim 1, wherein the first switch comprises a first contact that is connected to a ground, and a second contact that is connected to the second path.

8. The lighting system of a transport according claim 7, wherein the first switch is switchable to either the first contact or the second contact.

9. An aircraft comprising
the lighting system of a transport according to claim 1,
wherein the transport is an aircraft.

10. The aircraft according claim 9,
wherein the control cabin is a flight deck of the aircraft.

11. A lighting system of a transport comprising,
   a lighting device that illuminates a control cabin of the transport;
   a lighting power supply system including a first path which supplies power to the lighting device and a second path which supplies power to the lighting device;
   a first switch that enables and disables power supply through the first path; and
   a second switch that enables and disables power supply through the second path,
   wherein when a power switch for a control system used for controlling the transport is turned ON,
   the second switch is turned OFF to disable the power supply through the second path, and
   when the power switch is turned OFF,
   the first switch is turned OFF to disable the power supply through the first path.

12. The lighting system of a transport according to claim 11,
   wherein the transport includes a doorway that allows entrance and exit to/from the transport, and an entrance room that faces the doorway,
   the control cabin leads to the doorway through the entrance room,
   the first switch is located in the control cabin, and
   the second switch is located in the entrance room.

13. The lighting system of a transport according claim 11, wherein the power supply through the second path is enabled by turning ON the second switch when entrance into the control cabin is detected.

14. An aircraft comprising
the lighting system of a transport according to claim 11,
wherein the transport is an aircraft.

15. The aircraft according claim 14,
wherein the control cabin is a flight deck of the aircraft.

16. A lighting system of a transport comprising,
   a lighting device that illuminates a control cabin of the transport;
   a lighting power supply system including a first path which supplies power to the lighting device and a second path which supplies power to the lighting device;
   a first switch that enables and disables power supply through the first path; and
   a second switch that enables and disables power supply through the second path,
   wherein the second switch is provided outside of the control cabin.

17. An aircraft comprising
the lighting system of a transport according to claim 16,
wherein the transport is an aircraft.

18. The aircraft according claim 17,
wherein the control cabin is a flight deck of the aircraft.

\* \* \* \* \*